March 10, 1936.　　　　J. BENAGGIO　　　　2,033,371
SEALING DEVICE
Filed Aug. 3, 1935

INVENTOR.
Joseph Benaggio,
BY
ATTORNEYS

Patented Mar. 10, 1936

2,033,371

UNITED STATES PATENT OFFICE 2,033,371

SEALING DEVICE

Joseph Benaggio, Detroit, Mich.

Application August 3, 1935, Serial No. 34,597

2 Claims. (Cl. 292—307)

This invention relates to a device for preventing the unauthorized disassembly of a valve, stop cock or the like, such as is used in gas lines adjacent the meter for closing off the flow and where it has been found that such cock or valve is often taken apart to effect a pipe connection around the meter for the purpose of connection with the supply without registering the amount of gas used.

An object of the present invention is to provide a simple device which may be substituted for the usual lock washer which is interposed between the nut on the lower end of the valve and the body of the valve, this locking device being in the form of a cup with the cup provided with suitable sealing means whereby the nut may not be tampered with without breaking the seal.

A further object is to provide certain other new and useful features in the construction and arrangement of parts and in the form of the seal all as hereinafter more fully set forth and shown in the accompanying drawing, in which Fig. 1 is a side elevation of a stop cock or valve with the lower end portion thereof shown in section and illustrative of an embodiment of the present invention;

Figure 5:
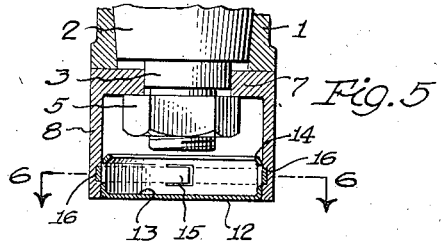
Figure 6:
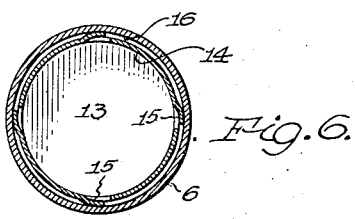
Figure 7:
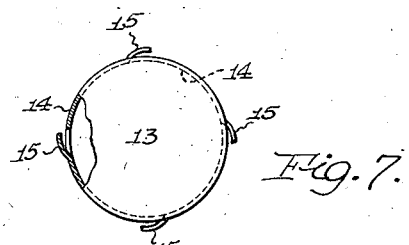
Figure 3:
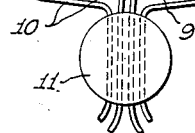
Fig. 3 is an end elevation of a cupped lock washer detached.
Figure 8:
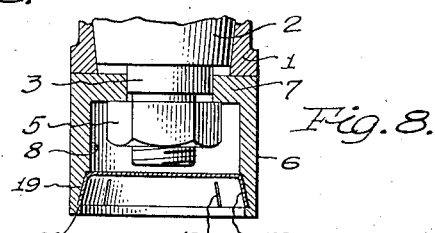
Figure 9:
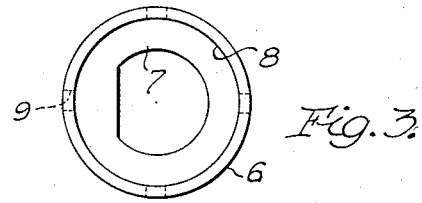
Figure 9:
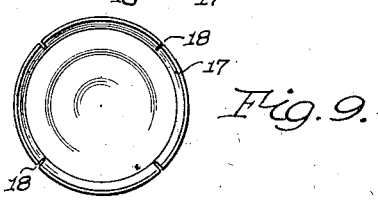
Figure 4:
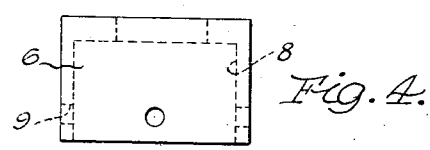

Fig. 4 a side elevation of Fig. 3;

Fig. 5 a sectional view of the lower end portion of the valve and showing a modified form of sealing means;

Fig. 6 is a transverse section upon the line 6—6 of Fig. 5;

Fig. 7 is an end elevation of the sealing means shown in Figs. 5 and 6 and showing the same in elevation and partly broken away to show the construction;

Fig. 8 is a sectional view similar to Fig. 5 and showing a modified form of sealing means, and Fig. 9 is an end elevation of the sealing means shown in Fig. 8.

In the drawing 1 indicates the body of the valve or stop cock and 2 the tapered plug or valve proper which has an end projection 3 of cylindrical form with one side cut away, or flattened as shown, and the lower end portion reduced in diameter and screw-threaded to receive a nut 5.

Ordinarily a common lock washer (not shown) is interposed between the nut and the end of the valve plug 2, this lock washer having the usual opening provided with a flat side to engage the flat side of the stem of the plug. In the present instance it is proposed to substitute for such lock washer, a washer of cupped form, indicated as a whole by the numeral 6 and this member is formed with an end wall 7 of suitable thickness to form a washer and provided with a round hole having a flat side to engage the flat side of the stem 3 of the valve plug. This cupped washer 6 is also formed with a peripheral flange or wall 8 to form a chamber for enclosing the nut 5 and screw-threaded end of the stem, and this wall, as shown in Figs. 1 to 4 inclusive, is formed with a series of holes 9 near its free end to receive one or more wires which are passed through these holes around the open end of the cup and then brought together and sealed by means of the usual lead seal 11. With this arrangement a wrench cannot be inserted in the cup without breaking the seal and thus showing that the device has been tampered with and as the nut 5 cannot be reached, it cannot be removed to disconnect it from the stem of the plug so that the plug may be removed to connect in a pipe for by-passing the gas, water or other fluid around the meter for metering the flow. Because of the engagement of the end wall of the cupped washer with the projecting end of the valve stem which is formed with a flat side, the cup will turn with the turning of the plug, the upper operating end which projects from the valve casing being exposed in the usual way so that the valve may be operated to shut off the flow at any time.

Figure 1:
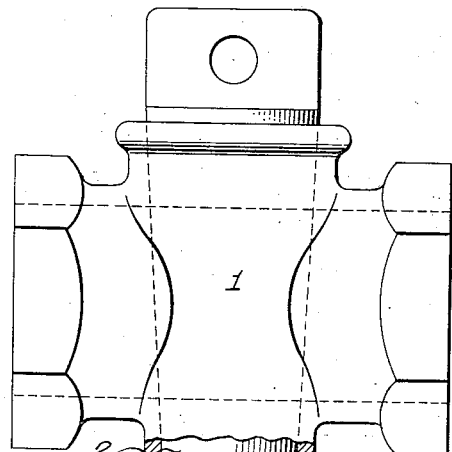
Figure 2:
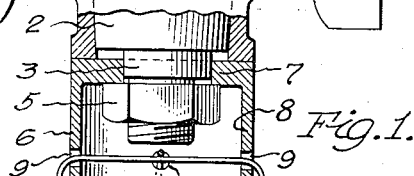
Fig. 2 is an elevation of the lower end of Fig. 1.

As a substitute for the wire sealing means shown in Figs. 1 and 2, a sheet metal seal 12 is shown in Fig. 3, this seal consisting of a cup formed of thin metal with an end wall 13 and a peripheral flange 14 adapted to be inserted within the open end of the cup 6, said flange being preferably inclined slightly in an outward direction so that in order to insert it within the open end of the cup, the flange 14 must be sprung inwardly slightly and thus will firmly engage within the cup, and to further insure the holding of the seal within the end of the cup the wall 14 of the seal is formed with struck out prongs 15 adapted to engage within an annular groove 16 adjacent the end of the cupped wall or flange 8 so that when the seal is forced into the cup, these prongs 15 will spring outwardly into the groove and thus firmly hold the seal in place so that it cannot be removed without being injured and thus show that it had been tampered with.

A further modified form of seal is shown in

Figs. 8 and 9, this seal being also formed of thin sheet metal with a peripheral flange 17 provided with slits 18 to permit its inward yielding, this flange, when formed, being inclined outwardly and of slightly greater diameter than the internal diameter of the annular wall of the cupped washer, which wall is formed with an undercut groove 19 at its free end which forms a slight annular shoulder 20 adjacent the end of the cupped wall so that when this sealing disk is forced into the cup, its edge flange will spring into the groove 19 and its end edge will engage beneath the shoulder 20, thus firmly holding the seal in place within the cup washer so that it may not be removed without injury which would show that it had been tampered with.

Obviously other changes may be made in the form of the sealing means and also in the form of the cupped washer 6 without departing from the spirit of the invention and such changes are contemplated.

Having thus fully described my invention, what I claim is:—

1. A device for application to the end of a valve stem having a flattened side and a reduced and screwthreaded end portion provided with a nut, said device comprising a member of cup shape form with an end wall having an opening of a diameter to receive the end of the stem said opening having a flat side to engage the flattened side of said stem, said member having an annular side wall forming a chamber to receive the nut, and a sealing disk for closing the open end of said cup beyond the end of said stem, said annular wall of said cup being formed adjacent its free edge with an internal annular groove and said sealing disk being formed with an annular flange provided with yieldable portions struck outwardly therefrom to engage said groove when said disk is forced into the open end of said cup.

2. A device as characterized in claim 1 adapted to be substituted for a washer, and further characterized in that said sealing disk is formed with an edge flange to extend inwardly of said cup from said disk and formed with a plurality of prongs struck outwardly from said flange to engage within said annular groove in the inner side of said annular wall of said cup.

JOSEPH BENAGGIO.